(12) United States Patent
Petro

(10) Patent No.: US 6,926,857 B2
(45) Date of Patent: Aug. 9, 2005

(54) CLOSURE ASSEMBLY WITH A FORMED EXTERIOR TOP

(75) Inventor: Richard J. Petro, Mokena, IL (US)

(73) Assignee: Phoenix Closures, Inc., Naperville, IL (US)

( * ) Notice: Subject to any disclaimer, the term of this patent is extended or adjusted under 35 U.S.C. 154(b) by 35 days.

(21) Appl. No.: 10/306,018

(22) Filed: Nov. 27, 2002

(65) Prior Publication Data

US 2004/0101641 A1 May 27, 2004

(51) Int. Cl.⁷ .............................................. B29C 45/00
(52) U.S. Cl. ................. 264/328.1; 264/237; 264/342 R
(58) Field of Search .............................. 264/328.1, 237, 264/342 R; 215/200

(56) References Cited

U.S. PATENT DOCUMENTS

| | | | | |
|---|---|---|---|---|
| 4,117,950 A | * | 10/1978 | Allen | 220/782 |
| 4,346,812 A | * | 8/1982 | Banich, Sr. | 215/352 |
| 4,489,844 A | * | 12/1984 | Breskin | 215/329 |
| 4,610,621 A | * | 9/1986 | Taber et al. | 425/577 |
| 4,693,410 A | * | 9/1987 | Selz | 229/400 |
| 5,100,009 A | * | 3/1992 | Thompson et al. | 215/341 |
| 5,474,194 A | * | 12/1995 | Heilman et al. | 215/230 |
| 5,582,315 A | * | 12/1996 | Reid | 220/254.4 |
| 5,806,699 A | * | 9/1998 | Ekkert et al. | 215/250 |
| 6,305,563 B1 | * | 10/2001 | Elliott | 215/235 |
| 6,673,301 B2 | * | 1/2004 | Cargile et al. | 264/509 |
| 6,729,487 B1 | * | 5/2004 | Dischler | 215/220 |

* cited by examiner

Primary Examiner—Michael P. Colaianni
Assistant Examiner—Monica A. Fontaine
(74) Attorney, Agent, or Firm—Welsh & Katz, Ltd.

(57) ABSTRACT

A closure whereby a mold in the shape of a closure is injected with plastic, allowed to cure or cool, forms a closure having a top portion surrounded by sidewalls, said top portion formed from two opposing surfaces, whereby at least one of said surfaces is domed shaped forming a closure having a flat top portion. Particularly, this invention provides different embodiments allowing for the formation of a closure with a flat top portion which is aesthetically pleasing and prevents against disorientation during production and moreover, prevents the sidewalls of the closure from collapsing inward.

19 Claims, 2 Drawing Sheets

Old (Prior Art)

CLOSURE ASSEMBLY WITH A FORMED EXTERIOR TOP

BACKGROUND OF THE INVENTION

The present invention relates to a closure, and more particularly a closure having one straight surface and one curved surface forming the top cover of the closure, or two curved surfaces forming the top cover of the closure.

Packaging containers are secured by closures in a wide variety of manufacturing applications. In the manufacturing industry many different products are filled into containers and securely sealed through the use of packaging machines. These packaging line machines work more quickly and efficiently when containers and closures can smoothly be maneuvered from one position to another through the manufacturing line until a final filled container is securely sealed.

Many advantages have been made through the years creating a manufacturing environment where packaging machines can efficiently and rapidly move closures from one area to another, until the container is filled and secured. In an effort to maintain a high packaging line speed, mechanisms have been developed for, picking a closure from a bulk supply, and transporting it to its final position onto the packaging reservoir. Although these applicators have lead to a more efficient production, if problems such as disorientation of the closure, or the breaking or bending of the closure occur during the packaging line process, it causes, in effect devastation to the efficiency of the entire production line. As such, it is critical to production to prevent against failure on the packaging line.

Some of the more typical problems associated with the packaging line are the result of closures becoming disoriented when moved from one area to another. When the closure is transferred from the bulk supply to a convey or belt, it is imperative that the orientation of the closure be top cover side up, as this facilitates the ease of the applicator to move the closure from the convey or belt onto the container. Subsequently, if the closure is not correctly placed over the container the entire packaging line is halted. In a typical closure, the top surface can have a depression or convex curve or a concave bulge caused by the molding process or by the pulling of gravity when sitting and cooling down after molding. It is generally the case, that when a plastic closure is removed and pushed away from its respective mold a depression may be caused in the top surface of the closure. In addition, the closure generally shrinks as it cools, causing warping of the top surface. Such an indentation or depression causes the closure to occasionally fall onto the convey or belt before being placed over the container, with its top surface or cover, face down and the skirt of the closure face up. Thus, excessive convex or concave deformation to the surface of the closure can cause flipping of the closure during the capping process, and such misorientation of the closure can cause havoc in the capping process. When this occurs the closure will be picked up, top down and wrongly placed over the container resulting in the failure and halting of the entire packaging line.

Moreover, the ability of a closure to withstand the manipulation and transport during manufacturing is facilitated by the strength of the top of the closure itself and its ability to prevent the sidewalls of the closure from collapsing inward. To ensure strength, most closures are made with a more durable material, and have thicker plastic tops, which in turn prevents against breaking and bending, and thus the closure is better able to withstand the packaging line process. The drawback with manufacturing closures with stronger, thicker materials is that it becomes more expensive to manufacture, in addition the closures are typically less flexible and manageable in the processing line. Therefore, there exists a need for a durable, stronger and relatively inexpensive closure that can be easily maneuvered through the high speed packaging line process and secured over containers without the closures warping.

Additionally, there exists a need for a closure, which eliminates the inward dome shaped top surface and specifically calls for a closure having a flat or straight top, which will prevent disorientation during the packaging process, by having the closure uniformly positionable top down on the packaging line and over the container. Another advantage for a closure having a flat or straight top surface or cover is that its appearance is much more aesthetically pleasing, as opposed to a closure having a sunken or depressed top surface.

SUMMARY OF THE INVENTION

A feature of the present invention is to provide a closure assembly with a flat or horizontal top surface or cover which is strong and durable yet flexible so as to prevent the sidewalls or skirt of the closure from shrinking or warping toward the center of the closure.

Another feature of the present invention is the prevention of the top surface or cover of the closure from flexing or warping inward or outward.

Yet another feature of the present invention is the prevention of the disorientation of the closure during the capping process, and an aesthetically pleasing exterior top surface.

This invention provides a closure assembly wherein the closure has a flat or horizontally disposed exterior top portion, resulting from a combination of one straight surface and one curved surface, or two oppositely curved surfaces forming the top of the closure.

BRIEF DESCRIPTION OF DRAWINGS

The invention will now be described by way of example with reference to the accompanying schematic drawings.

In the drawings there is shown.

DETAILED DESCRIPTION OF DRAWINGS

Figure 1:
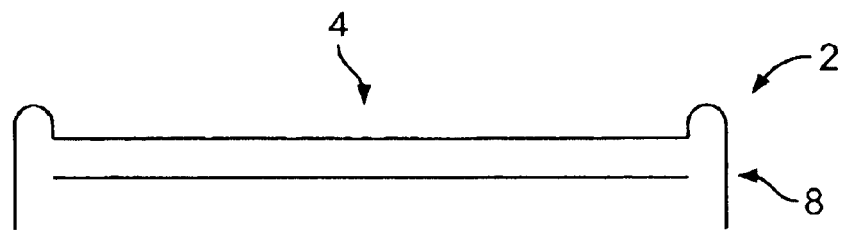
FIG. 1 represents the structure of a cap according to the prior art.

Referring first to FIG. 1, which shows a frontal view of a general closure (2), illustrating the top portion or cover (4) of the closure having a flattened or horizontal surface. Now referring to the other drawings and particularly to FIGS. 2, 3, 4 and 5 which all illustrate different embodiments of the present invention. Generally, the closure (2), is used for covering and securing the opening of a container or packaging reservoir, and is made of a resilient yet flexible plastic material, preferably polypropylene, polyethylene or like material. The closure (2) of the present invention is preferably rounded in form, however may vary in shape so long as it fully encompasses the opening or mouth of the packaging reservoir to ensure the containment of the contents and may be circular or rectangular as desired. The closure (2) can be described as having an inverted hollow cup shape with a top surface (4), and downwardly extending external sidewalls (6) forming a skirt (8).

The top of the closure (4) is configured to include two opposing or mating surfaces, an exterior or first surface (10) and interior or second (12) surface. The exterior or first surface of the closure (10) faces away from the opening of the container, and is exposed to the outer environment. The exterior or first surface (10) of the top (4) of the closure (2) has a center (14). As the exterior or first surface (10) expands away from the center (14) it forms an edge or border (16), which encompasses the entire edge of the closure (2) and defines the perimeter from which the sidewalls (6) project downward, forming the skirt (8). This rim or edge (16) may be slightly raised or rimmed extending from the edge of the top (4) of the closure (2) to the sidewalls (6) wherein the sidewalls (6) define an inner (18) and outer (20) edge. The inner edge (18) of the sidewall (6) faces interior to the top of the closure, while the outer edge (20) of the sidewall (6) faces away from the top (4) of the closure (2).

As the sidewalls (6) extend down, perpendicular to the top and parallel to each other, they form the skirt (8) of the closure (2). The skirt (8) defines an inner (22) and outer (24) surface, and may vary in length, as long as the closure substantially encompasses the opening or mouth of the container and covers the neck of the container. The inner surface of the skirt (22) may include horizontal rims or ridges, which by a rotational movement of the closure (2), facilitates the locking and unlocking means of the closure (2) to the container. The exterior of the skirt (24) while it may be smooth, may also provide ribs or a plurality of raised projections facilitating an easier means for gripping and unlocking.

Figure 2:
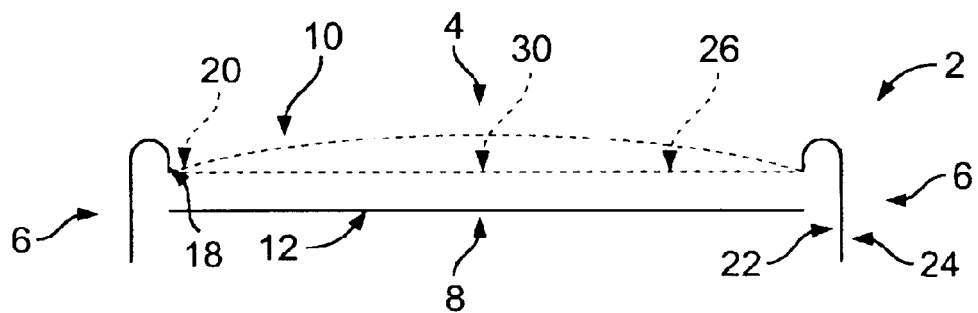
FIG. 2 shows the frontal view of a first embodiment of the closure.
Figure 3:
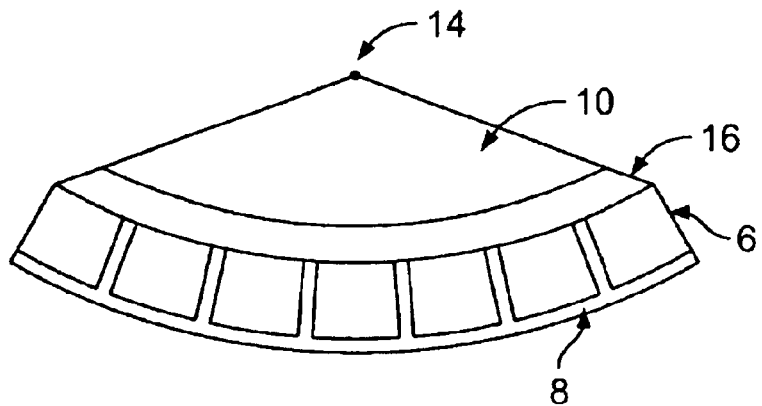
FIG. 3 illustrates a perspective view of the closure of FIG. 2.
Figure 4:
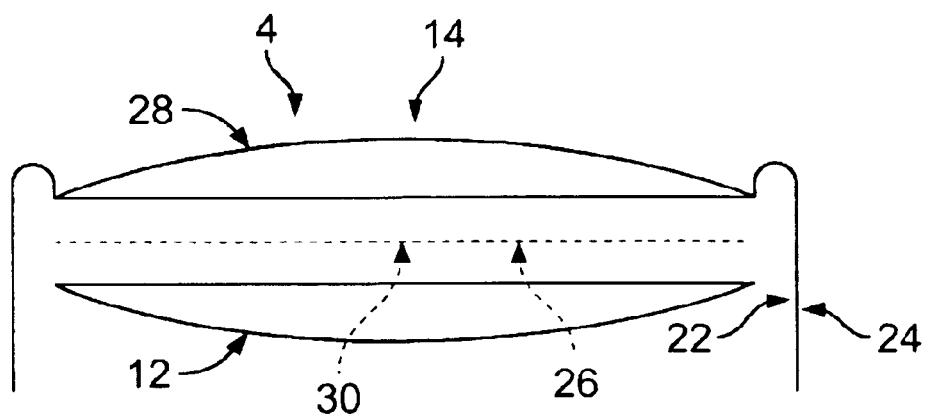
FIG. 4 shows the frontal view of the second embodiment of the closure of FIG. 2.

The major axis or horizontal plane of the closure (26), which is illustrated in FIGS. 2, 3 and 4 is depicted in the drawings by a dashed horizontal line, and is perpendicular to the sidewalls (6) or skirt (8) of the closure (2). This horizontal axis (26) is where both the exterior or first surface (10) and the interior or second surface (12) abut or mate forming the top portion (4) of the closure (2). Above and below the major axis (26) are the exterior (10) and interior (12) surfaces of the closure (2).

In a typical closure, as depicted in FIG. 1, both the exterior or first (10) and interior (10) or second surfaces (12) are heretofore, desirably horizontally disposed and generally completely level or flat with respect to the skirt (8). During the molding process, as the plastic is injected, the two opposing surfaces of the mold come together forming the closure (2). After some cooling, the closure is ejected and in effect pushed out of the mold, resulting in a closure having a generally warped or domed top portion. In the present invention however, while the mold is formed with the injection of the plastic similar to that of the prior art, the ejected closure is removed from the mold without any indication of warping or depression of the top portion (4) of the closure (2), due to the fact that the mold of the closure forms two opposing surfaces with at least one surface having a curved shape.

In one particular embodiment, illustrated in FIG. 2 and FIG. 3, the exterior or first surface (10), is configured to form a rounded, arcuate or convex shape over the major or horizontal axis of the closure (26), thus providing an arc over the horizontal plane (26). This domed or rounded exterior or first surface (10) begins its rounded shape from the rim or edge (16) of the top (4) of the closure (2), abutting the sidewalls (6) and meeting the horizontal plane or major axis (26). From the sidewall edges or rim of the closure (16), the exterior or first surface (10) begins to curve away from the major axis (26), forming a distance between the horizontal plane (26) of the top (4), and the arcuate or domed exterior or first surface (10). The length between the center of the major axis or horizontal plane (30) and the center or apex of the curve or dome of the exterior or first surface (10) is the point in which there is the greatest amount of distance between the two planes. Specifically, the distance between the convex center of the exterior surface (14) and the center of the horizontal plane (30) is about 0.002 inches to about 0.100 inches, and preferably between about 0.005 inches to about 0.025 inches and most preferably from about 0.010 inches to about 0.015 inches.

Moreover, in this particular embodiment the interior or second surface (12) of the top (4) extends across the top (4) of the closure (2) and projects from the inner edge for the sidewall (18), parallel to the horizontal plane (26) and perpendicular to the sidewall (6) or skirt (8) of the closure (2), forming a flat surface. The interior or second surface (12) and exterior or first surface (10) abut or mate forming the strengthened top surface or cover (4) during the molding process and resulting in a formed closure after cooling which has a flat top portion.

Another embodiment of this invention is depicted best in FIG. 3 and FIG. 4, and shows the exterior or first surface (10) again forming a convex shape (28) relative to the major axis of the closure (26) wherein the greatest distance between the convex center or apex of the exterior or first surface (10) and the center of the horizontal plane (30) can be measured at between about 0.002 inches to about 0.100 inches, and preferably between about 0.005 inches to about 0.025 inches, and most preferably from about 0.010 inches to about 0.015 inches, while the interior or second surface (12) is similarly curved or rounded, however the arc of the interior or second surface (12) is configured away from the horizontal plane (26) of the top (4) forming a concave shape. The concave shape of the interior or second surface (12) begins at the inner edge or rim of the top of the closure (4) and rounds away from the horizontal plane of the closure (26) until it reaches the center of the top (14), having its furthest distance away from the closure (2) at that center point (14), wherein it again begins to curve back to the inner edge or rim (16) of the top of the closure (4) forming a concave surface. Specifically, the distance between the arcuate or convex center of the interior or second surface (14) and the center of the horizontal plane (30) is about 0.002 inches to about 0.100 inches, and preferably between about 0.005 inches to about 0.025 inches, and most preferably from about 0.010 inches to about 0.015 inches.

Figure 5:
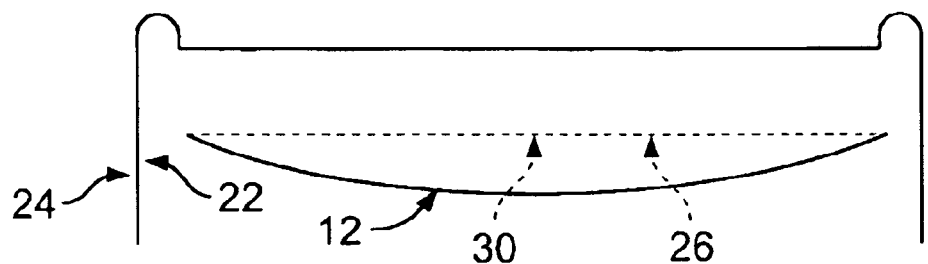
FIG. 5 shows the frontal view of the third embodiment of the closure of FIG. 2.

Yet another embodiment of the present invention is illustrated in FIG. 3 and FIG. 5 and shows the exterior or first surface (10) as being flat or parallel to the horizontal plane (26) of the closure. As such, when the exterior or first surface (10) begins from the inner edge of the sidewall (18) it extends across the major or horizontal axis (26) and remains flat until it reaches the other side of the inner edge of the sidewall (18). The interior or second surface (12) on the other hand is concave in shape and is described in the second embodiment of the invention, and again has a distance between the arcuate or concave center (14) of the interior or second surface (12) and the center of the horizontal plane (30) of about 0.001 inches to about 0.100 inches, and preferably between about 0.005 inches to about 0.025 inches. The exterior or first surface (10) and interior or second surface (12) then abut or mate forming the top surface or cover (4) of the closure (2).

Therefore, as described previously, during the molding process, plastic is injected into a mold, whereby the plastic flows and is thereafter cooled enough to solidify and ejected to form a closure. Particularly, in the present invention the mold is formed by two mating surfaces in a form of a closure. Of these two opposing surfaces, one curved or domed surface, while the other is straight, or both curved or domed surfaces, form a closure having a straight or flat top portion. This feature provides not only a more pleasing appearance of the closure, but prevents against disorientation of the closure itself during the capping process. Moreover, this flat or horizontal top surface feature of the closure also prevents the sidewalls of the closure from collapsing inward, resulting in a closure which is stronger, more durable yet flexible and can easily be utilized in high speed packaging process without breaking or bending.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method of making a closure from plastic, the method comprising the steps of:
   a) preparing a mold in a shape of a closure;
   b) injecting plastic into the mold;
   c) forming a closure having a top surrounded by sidewalls, said top having opposing surfaces, one of said surfaces being temporarily domed for approximately the entire top;
   d) ejecting said closure;
   e) allowing said closure to cure and cool; and
   f) causing the top, including the temporarily domed surface, to be flat.

2. A method according to claim 1, including the step of forming the top of the closure with upper and lower opposing surfaces, said upper surface forming a dome, and said lower surface forming a straight plane,
   forming a horizontal axis by abutting said domed upper surface and said straight lower surface,
   said horizontal axis having a center and being parallel to said upper and lower surfaces and perpendicular to said sidewalls,
   forming a convex curve of said domed shape upper surface, curving convexly over said horizontal axis, and forming an apex over the center of said horizontal axis,
   forming a straight plane of said lower surface, interior to said top, and parallel to said horizontal axis,
   whereby said convexly curved upper surface and straight lower surface abut each other forming the top of the closure.

3. A method according to claim 2, wherein said distance between the center of the horizontal axis and the apex of the domed first surface is from about 0.001 inches to about 0.100 inches.

4. A method according to claim 2, wherein said the distance between the center of the horizontal axis and the apex of the domed first surface is from about 0.005 inches to about 0.025 inches.

5. A method according to claim 1, including the step of forming the top of the closure with upper and lower opposing surfaces, said upper surface and said lower surface each forming a dome,
   forming a horizontal axis by abutting said domed upper surface and said domed lower surface,
   said horizontal axis having a center and being parallel to said upper and lower surfaces and perpendicular to said sidewalls,
   forming a convex curve of said domed shape upper surface curving convexly over said horizontal axis, and forming an apex over the center of said horizontal axis,
   forming a concave curve of said lower surface, interior to said top cover and curving concavely over said horizontal axis and forming an apex over the center of said horizontal axis,
   whereby said convexly curved upper surface and concavely curved lower surface abut each other forming the top portion of the closure.

6. A method according to claim 5, wherein said distance between the center of the horizontal axis and the apex of the domed upper surface is from about 0.001 inches to about 0.100 inches.

7. A method according to claim 5, wherein said the distance between the center of the horizontal axis and the apex of the domed upper surface is from about 0.005 inches to about 0.025 inches.

8. A method according to claim 5, wherein said distance between the center of the horizontal axis and the apex of the domed lower surface is from about 0.001 inches to about 0.100 inches.

9. A method according to claim 5, wherein said the distance between the center of the horizontal axis and the apex of the domed lower surface is from about 0.005 inches to about 0.025 inches.

10. A method according to claim 1, including the step of forming the top of the closure with upper and lower opposing surfaces, said upper surface forming a straight plane and said lower surface forming a dome,
    forming a horizontal axis by abutting said straight upper surface and said domed lower surface,
    said horizontal axis having a center and being parallel to said upper and lower surfaces and perpendicular to said sidewalls,
    forming a straight plane of said upper surface, and
    forming a concave curve of said second surface, interior to said top cover and curving concavely over said horizontal axis and forming an apex over the center of said horizontal axis,
    whereby said straight upper surface and concavely curved lower surface abut each other forming the top portion of the closure.

11. A method according to claim 10, wherein said distance between the center of the horizontal axis and the apex of the domed second surface is from about 0.001 inches to about 0.100 inches.

12. A method according to claim 10, wherein said the distance between the center of the horizontal axis and the apex of the domed second surface is from about 0.005 inches to about 0.025 inches.

13. A method of making a closure from plastic, the method comprising the steps of:

a) preparing a mold in a shape of a closure;

b) injecting plastic into the mold;

c) forming a closure having a top surrounded by sidewalls, said top having upper and lower opposing surfaces, one of the surfaces temporarily having a dome portion;

d) ejecting said closure from the mold;

e) allowing said closure to cure and cool; and f) causing the closure to have a flat top without a dome portion.

14. The method of claim 13, wherein the opposing surfaces are mated to thereby form the flat top.

15. The method of claim 13, wherein the entire top of the formed closure is a contiguous flat surface.

16. The method of claim 13, wherein the dome portion extends approximately the entire top.

17. The method of claim 16, wherein the lower opposing surface is approximately entirely domed away from the upper opposing surface.

18. The method of claim 16, wherein the upper opposing surface is approximately entirely domed away from the lower opposing surface.

19. The method of claim 16, wherein both the upper and lower opposing surfaces are domed away from each other.

* * * * *